United States Patent

Staker, Jr.

[15] 3,694,667

[45] Sept. 26, 1972

[54] SINGLE PULSE TEST CIRCUIT

[72] Inventor: William C. Staker, Jr., Springfield, Ohio

[73] Assignee: General Motors Corporation, Detroit, Mich.

[22] Filed: Sept. 22, 1971

[21] Appl. No.: 182,595

[52] U.S. Cl. ..................307/232, 307/225, 307/269, 328/110

[51] Int. Cl. ..............................................H03k 5/20

[58] Field of Search......307/215, 225, 234, 247, 232, 307/269; 328/41, 110

[56] References Cited

UNITED STATES PATENTS 3,035,187 5/1962 Reichert ..................328/41 X 3,611,158 10/1971 Strathman .................307/234

*Primary Examiner*—John Zazworsky

*Attorney*—Eugene W. Christen et al.

[57] ABSTRACT

A single pulse test circuit for separating, upon the operation of an electrical switch, a single electrical pulse from a series of electrical pulses simultaneously applied to the clock pulse input terminal of each of two J–K flip-flop circuits. The Q and $\bar{Q}$ output terminals of the first J–K flip-flop circuit are connected to the J and K input terminals, respectively, of the second J–K flip-flop circuit. Circuitry, including the electrical switch, is provided for applying a logic "one" electrical signal to a selected one of the input terminals and a logic "zero" electrical signal to the other input terminal of the first J–K flip-flop circuit and, upon the operation of the electrical switch, for reversing the electrical signals applied to each one of the input terminals. NAND gate logic circuitry responsive to the same logic electrical signal upon each the Q output terminal of the first J–K flip-flop circuit and the $\bar{Q}$ output terminal of the second J–K flip-flop circuit and one of the series of electrical pulses is provided for producing a single output electrical pulse of a magnitude and width equal to the magnitude and width of the pulses of the series of electrical pulses upon the operation of the electrical switch.

4 Claims, 4 Drawing Figures

| $t_n$ | | $t_{n+1}$ | |
|---|---|---|---|
| J | K | Q | $\bar{Q}$ |
| 0 | 0 | $Q_n$ | $\bar{Q}_n$ |
| 1 | 0 | 1 | 0 |
| 0 | 1 | 0 | 1 |
| 1 | 1 | $\bar{Q}_n$ | $Q_n$ |

$t_n$ — TIME PERIOD PRIOR TO NEGATIVE TRANSITION OF CLOCK PULSE $t_{n+1}$ — TIME PERIOD SUBSEQUENT TO NEGATIVE TRANSITION OF CLOCK PULSE $Q_n$ STATE OF Q OUTPUT TERMINAL IN TIME PERIOD $t_n$

| A | B | $\overline{AB}$ |
|---|---|---|
| 0 | 0 | 1 |
| 0 | 1 | 1 |
| 1 | 0 | 1 |
| 1 | 1 | 0 |

| A | B | C | $\overline{ABC}$ |
|---|---|---|---|
| 0 | 0 | 0 | 1 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 0 |

INVENTOR.
William C. Staker, Jr.
BY
Richard G. Stahr
ATTORNEY

SINGLE PULSE TEST CIRCUIT

This invention is directed to a single pulse test circuit and, more specifically, to an electrical circuit for separating a single electrical pulse from a series of electrical pulses upon the operation of an electrical switch.

Frequently, it is desirable to test a digital data processing system by applying thereto single clock pulses of the same magnitude and width as the master clock pulses so that the system may be visually monitored by indicator lamps. Therefore, a circuit which is capable of separating a single clock pulse from a series of digital data processing system clock pulses upon the operation of an electrical switch and directing each single pulse to the main system through the clock signal input is desirable.

It is, therefore, an object of this invention to provide a single pulse test circuit for separating a single electrical pulse from a series of electrical pulses upon the operation of an electrical switch.

It is another object of this invention to provide a single pulse test circuit for separating a single electrical pulse from a series of electrical pulses upon the operation of an electrical switch wherein the logic elements are J–K flip-flop circuits and NAND gates.

In accordance with this invention, a single pulse test circuit for separating a single electrical pulse from a series of electrical pulses upon the operation of an electrical switch is provided wherein an electrical signal corresponding to a logic "one" and an electrical signal corresponding to a logic "zero" are applied through the electrical switch to respective J and K input terminals of a first J–K flip-flop circuit having the Q and $\overline{Q}$ output terminals thereof connected to the J and K input terminals, respectively, of a second J–K flip-flop circuit, the series of pulses from which a single pulse is to be separated are applied to the clock input terminal of both J–K flip-flop circuits and a three-input NAND gate which, in cooperation with a two-input NAND gate connected in cascade therewith, are responsive to the same logic electrical signal upon each the Q output terminal of the first J–K flip-flop circuit and the $\overline{Q}$ output terminal of the second J–K flip-flop circuit and one of the series of electrical pulses to produce a single output electrical pulse upon the operation of the electrical switch to reverse the logic electrical signal applied to each respective J and K input terminal of the first J–K flip-flop circuit.

For a better understanding of the present invention, together with additional objects, advantages and features thereof, reference is made to the following description and accompanying drawing in which:

FIG. 1 sets forth the single pulse test circuit of this invention in block form;

Figures 1, 2, 3, 4:
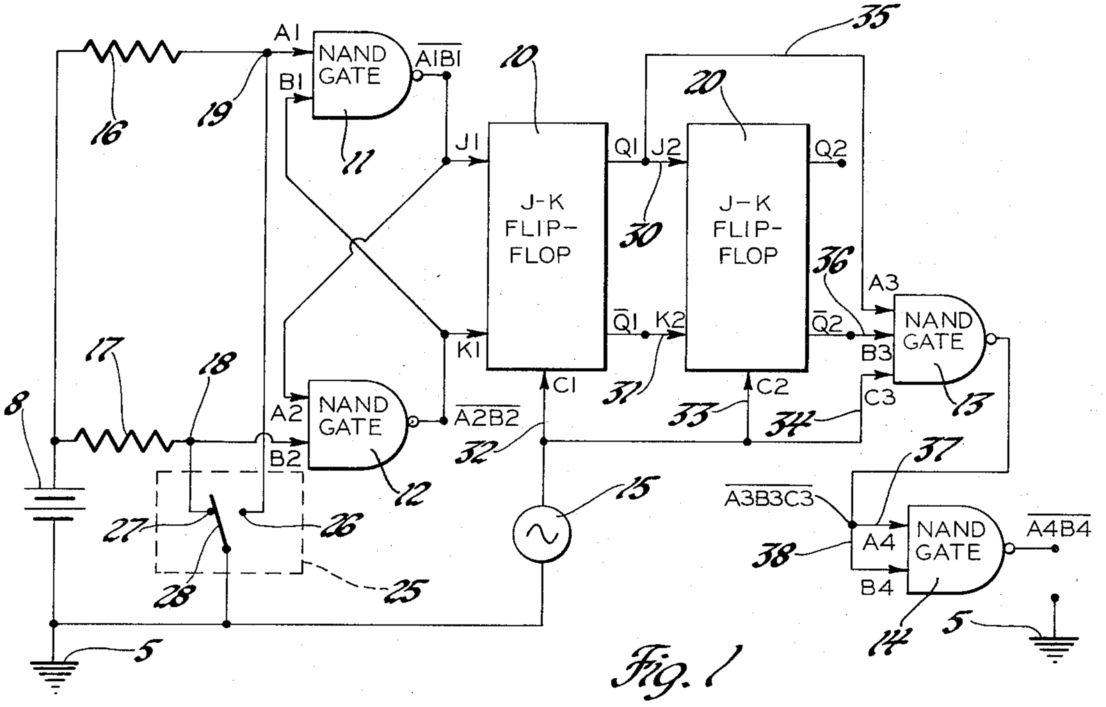
FIG. 2 is a truth table for the J–K flip-flop circuits employed in the single pulse test circuit of this invention.
FIG. 3 is a truth table for a two-input NAND gate used with the single pulse test circuit of this invention.
FIG. 4 is a truth table for a three-input NAND gate used with the single pulse test circuit of this invention.

The J–K flip-flop circuit is a logic memory element which yields a predictable output for every possible combination of pulse inputs which has recently become commercially available in the form of minute monolithic blocks of semiconductor material upon which all of the circuit elements are formed. The J–K flip-flop is described by Montgomery Phister, Jr., beginning on page 128 of Logical Design of Digital Computers, John Wiley & Sons Inc., 1958. Briefly, the J–K flip-flop circuit exhibits the properties reflected in the truth table set forth in FIG. 2 of the drawing. If there are no signals applied to either the J or K input terminals, the component remains in its pre-existing state; if no signal is applied to the J input terminal but a signal is applied to the K input terminal, the component is placed in the logic 0 state; if a signal is applied to the J input terminal but no signal is applied to the K input terminal, the component is placed in the logic 1 state and, if signals are simultaneously applied to both the J and K input terminals, the state of the component reverses from the state that pre-existed the application of the signals. It is to be understood that all of the transitions represented in the truth table of FIG. 2 require the application of a clock pulse in addition to the J and K signals, if any. As J–K flip-flop circuits and logic NAND gates are commercially available items which are well known in the digital data processing art, these components have been set forth in block form in FIG. 1.

For purposes of this specification and without intention or inference of a limitation thereto, the convention will be adapted that the presence of a signal represents the binary value unity or a logic "one" and the absence of a signal represents the binary value zero or a logic "-zero", hereinafter referred to as a logic 1 and a logic 0, respectively.

Referring to FIG. 1 of the drawing, the single pulse test circuit of this invention for separating a single electrical pulse from a series of electrical pulses upon the output operation of an electrical switch is set forth in block form in combination with a source of a series of electrical pulses 15 and an electrical switch 25 and includes first and second type J–K flip-flop circuits 10 and 20, each having a J and a K input terminal, a clock pulse input terminal C and a Q and a $\overline{Q}$ output terminal; circuitry including electrical switch 25 for applying a logic 1 electrical signal to a selected one of the input terminals and a logic 0 electrical signal to the other one of the input terminals of the first J–K flip-flop circuit 10 and, upon the operation of electrical switch 25, for reversing the electrical signals applied to each of the input terminals thereof and circuitry responsive to the same logic electrical signal upon each the Q output terminal of the first J–K flip-flop circuit 10 and the $\overline{Q}$ output terminal of the second J–K flip-flop circuit 20 and one of the series of electrical pulses for producing a single output electrical pulse.

The source of a series of electrical pulses 15 may be any conventional and well known oscillator circuit of the type suitable for use as a source of clock pulses for a digital data processing system. Consequently, this pulse source has been illustrated schematically in FIG. 1.

The electrical switch 25 may be any conventional single pole-double throw electrical switch having two stationary contacts 26 and 27 and a movable contact 28 and preferably of the momentary contact type in which the movable contact 28 is spring or otherwise biased to normally electrically contact either one of the stationary contacts and operable to electrically contact the other stationary contact.

The circuitry including electrical switch 25 for applying a logic 1 electrical signal to a selected one of the input terminals and a logic 0 electrical signal to the other one of the input terminals of the first J–K flip-flop circuit 10 and, upon the operation of electrical switch 25, for reversing the electrical signals applied to each of the input terminals thereof includes, in addition to electrical switch 25, a direct current potential source 8, resistors 16 and 17, two-input NAND gates 11 and 12 and the interconnecting circuitry. The source of direct current potential 8 may be any conventional direct current potential source well known in the art and may, for example, be one of the direct current potential sources included in the digital data processing system with which the single pulse test circuit of this invention is being used. Therefore, this direct current potential source has been schematically illustrated in FIG. 1 as a battery. The positive polarity terminal of battery 8 is connected to the A1 input terminal of NAND gate 11 and the B2 terminal of NAND gate 12 through respective resistors 16 and 17. The A1 input terminal of NAND gate 11 and the B2 input terminal of NAND gate 12 are connected to stationary contacts 26 and 27, respectively, of electrical switch 25 and movable contact 28 of switch 25 is connected to the negative polarity terminal of battery 8 through point of reference or ground potential 5. The $\overline{A1B1}$ output terminal of NAND gate 11 is connected to the J1 input terminal of J–K flip-flop circuit 10 and the A2 input terminal of NAND gate 12 and the $\overline{A2B2}$ output terminal of NAND gate 12 is connected to the K1 input terminal of J–K flip-flop circuit 10 and the B1 input terminal of NAND gate 11. Cross-connected NAND gates 11 and 12 comprise a well known latching circuit which eliminates the possible introduction of spurious electrical signals into the single pulse test circuit of this invention which may be created by "contact bounce" of electrical switch 25. It is to be specifically understood that junction 18 between resistor 17 and stationary contact 27 of electrical switch 25 may be connected to the J1 or K1 input terminals of J–K flip-flop circuit 10 and that junction 19 between resistor 16 and stationary contact 26 of electrical switch 25 may be connected to the other input terminal of J–K flip-flop circuit 10 without departing from the spirit of the invention.

The circuitry responsive to the same logic electrical signal upon each the Q output terminal of the first J–K flip-flop circuit 10 and the $\overline{Q}$ output terminal of the second J–K flip-flop circuit 20 and one of the series of electrical pulses for producing a single output electrical pulse may be three-input NAND gate 13 and a signal inverter circuit which may be, for example, two-input NAND gate 14 or any other well known signal inverter circuit.

The Q1 and $\overline{Q1}$ output terminals of the first J–K flip-flop circuit 10 are connected to the J2 and K2 input terminals, respectively, of the second J–K flip-flop circuit 20 through respective leads 30 and 31.

The source of a series of electrical pulses 15 is connected to the C1 and C2 clock input terminals of both J–K flip-flop circuits 10 and 20 and to one of the input terminals C3 of three-input NAND gate 13 through respective leads 32, 33 and 34.

The Q1 output terminal of the first J–K flip-flop circuit 10 is connected to another one of the input terminals A3 of three-input NAND gate 13 through lead 35 and the $\overline{Q2}$ output terminal of the second J–K flip-flop circuit 20 is connected to the third input terminal B3 of NAND gate 13 through lead 36.

The $\overline{A3B3C3}$ output terminal of three-input NAND gate 13 is connected to both the A4 and B4 input terminals of NAND gate 14 through respective leads 37 and 38.

The single pulse produced by the single pulse test circuit of this invention is equal to A3B3C3 and, if necessary, may be taken across the $\overline{A4B4}$ output terminal of NAND gate 14 and point of reference or ground potential 5 and applied to the clock input circuit of the digital data processing system with which it is being used or to any other suitable external utilization circuitry.

With movable contact 28 of electrical switch 25 closed to stationary contact 27, a logic 1 electrical signal of a positive polarity is applied to the A1 input terminal of NAND gate 11 through resistor 16 and a logic 0 electrical signal, ground potential in this instance, is applied to the B2 input terminal of NAND gate 12. Referring to the truth table for a two-input NAND gate as set forth in FIG. 3, a circuit component of this type will produce a logic 1 output signal with the presence of a logic 0 input signal upon either the A input terminal, the B input terminal or both and will produce a logic 0 output signal with the presence of a logic 1 input signal upon both the A and B input terminals. Consequently, NAND gate 12 produces a logic 1 output signal upon the $\overline{A2B2}$ output terminal which is applied to the K1 input terminal of J–K flip-flop circuit 10 and to the B1 input terminal of NAND gate 11. As a logic 1 input signal is present upon both the A1 and B1 input terminals of NAND gate 11, a logic 0 output signal appears upon the $\overline{A1B1}$ output terminal thereof which is applied to the J1 input terminal of J–K flip-flop circuit 10 and the A2 input terminal of NAND gate 12. Consequently, a logic 1 electrical signal is present upon the K1 input terminal of J–K flip-flop circuit 10 and a logic 0 electrical signal is present upon the other or the J1 input terminal of J–K flip-flop circuit 10.

As the pulses, hereinafter referred to as clock pulses, produced by source of a series of electrical pulses 15 are applied to the C1 and C2 clock pulse input terminals of J–K flip-flop circuits 10 and 20 and the C3 input terminal of NAND gate 13, the single pulse test circuit of this invention will stabilize in the condition of both J–K flip-flop circuits in the logic 0 state with a logic 0 electrical signal present upon the $\overline{Q1}$ and $\overline{Q2}$ output terminals of J–K flip-flop circuits 10 and 20, respectively, and a logic 1 electrical signal upon the Q1 and Q2 output terminals of J–K flip-flop circuits 10 and 20, respectively. Referring to the truth table for a three-input NAND gate as set forth in FIG. 4, a circuit component of this type will produce a logic 1 output signal with the presence of a logic 0 input signal upon any one of the input terminals A3, B3 or C3 and will produce a logic 0 output signal with the presence of a logic 1 input signal upon all input terminals A3, B3 and C3. Consequently, as a logic 0 output signal appears upon the Q1 output terminal of J–K flip-flop 10 which is applied to input terminal A3 of NAND gate 13, NAND gate 13 produces a logic 1 output signal upon the $\overline{A3B3C3}$ output terminal thereof. As this logic 1 electrical signal is applied to both the A4 and B4 input terminals of two-input NAND gate 14, NAND gate 14 produces a logic 0 output signal upon the $\overline{A4B4}$ output terminal thereof.

Upon the operation of movable contact 28 of electrical switch 25 into electrical contact with stationary contact 26 thereof, a logic 1 electrical signal of a positive polarity is applied to the B2 input terminal of NAND gate 12 through resistor 17 and a logic 0 electrical signal, ground potential in this instance, is applied to the A1 input terminal of NAND gate 11. Consequently, a logic 1 output signal appears upon the $\overline{A1B1}$ output terminal of NAND gate 11 which is applied to the J1 input terminal of J–K flip-flop circuit 10 and to the A2 input terminal of NAND gate 12. As a logic 1 input signal is present upon both the A2 and B2 input terminals of NAND gate 12, a logic 0 output signal appears upon the $\overline{A2B2}$ output terminal thereof which is applied to the K1 input terminal of J–K flip-flop circuit 10 and the B1 input terminal of NAND gate 11. That is, upon the operation of movable contact 28 of electrical switch 25 to stationary contact 26, the electrical signals applied to each of the J1 and K1 input terminals of flip-flop circuit 10 are reversed.

At this time a logic 1 electrical signal is present upon the J1 and K2 input terminals of respective flip-flop circuits 10 and 20 and a logic 0 electrical signal is present upon the K1 and J2 input terminals of respective flip-flop circuits 10 and 20. Upon the next negative transition of a clock pulse with a logic 1 electrical signal and a logic 0 electrical signal present upon respective J1 and K1 input terminals of J–K flip-flop circuit 10, this device is triggered to the logic 1 state with a logic 1 output signal upon the Q1 output terminal and a logic 0 output signal upon the $\overline{Q1}$ output terminal and, with a logic 1 electrical signal and a logic 0 electrical signal present upon respective K2 and J2 input terminals of flip-flop circuit 20, this device remains in the logic 0 state with a logic 0 output signal upon the Q2 output terminal and a logic 1 output signal upon the $\overline{Q2}$ output terminal. The logic 1 output signal present upon the Q1 output terminal of J–K flip-flop circuit 10 and the logic 1 output signal present upon the $\overline{Q2}$ output terminal of J–K flip-flop circuit 20 are applied with the next clock pulse to respective input terminals A3, B3 and C3 of NAND gate 13, consequently, this device produces a logic 0 output signal upon the $\overline{A3B3C3}$ output terminal thereof. This logic 0 output signal is applied to both the A4 and B4 input terminals of two-input NAND gate 14 which produces a logic 1 output signal upon the $\overline{A4B4}$ output terminal thereof. Upon the next negative transition of a clock pulse, J–K flip-flop circuit 10 is unaffected and remains in the logic 1 state. However, with a logic 1 electrical signal and a logic 0 electrical signal present upon respective J2 and K2 input terminals of J–K flip-flop circuit 20, this device is triggered to the logic 1 state with a logic 1 output signal present upon the Q2 output terminal and a logic 0 output signal present upon the $\overline{Q2}$ output terminal thereof. The logic 0 electrical signal present upon the $\overline{Q2}$ output terminal of J–K flip-flop circuit 20 is applied to the B3 input terminal of three-input terminal NAND gate 13, consequently this device produces a logic 1 output signal upon the $\overline{A3B3C3}$ output terminal thereof. This logic 1 output signal is applied to both the A4 and B4 input terminals of NAND gate 14 which produces a logic 0 output signal upon the $\overline{A4B4}$ output terminal thereof. The single pulse test circuit of this invention stabilizes in this condition so long as movable contact 28 of switch 25 is maintained in electrical contact with stationary contact 26, consequently, only one single output electrical pulse is produced.

Upon the return of movable contact 28 of electrical switch 25 into electrical contact with stationary contact 27 thereof, a logic 1 electrical signal of a positive polarity is applied to the A1 input terminal of NAND gate 11 through resistor 16 and a logic 0 electrical signal, ground potential in this instance, is applied to the B2 input terminal of NAND gate 12. Consequently, a logic 1 output signal appears upon the $\overline{A2B2}$ output terminal of NAND gate 12 which is applied to the K1 input terminal of J–K flip-flop circuit 10 and to the B1 input terminal of NAND gate 11. As a logic 1 input signal is present upon both the A1 and B1 input terminals of NAND gate 11, a logic 0 output signal appears upon the $\overline{A1B1}$ output terminal thereof which is applied to the J1 input terminal of J–K flip-flop circuit 10 and the A2 input terminal of NAND gate 12. Consequently, a logic 1 electrical signal is present upon the J2 and K1 input terminals of respective flip-flop circuits 10 and 20 and a logic 0 electrical signal is present upon the J1 and K2 input terminals of respective flip-flop circuits 10 and 20. Upon the next negative transition of a clock pulse with a logic 1 electrical signal and a logic 0 electrical signal present upon respective K1 and J1 input terminals of J–K flip-flop circuit 10, this device is triggered to the logic 0 output signal upon the Q1 output terminal and a logic 1 output signal upon the $\overline{Q1}$ output terminal and with a logic 1 electrical signal and a logic 0 electrical signal present upon respective J2 and K2 input terminals of flip-flop circuit 20, this device is triggered to the logic 1 state with a logic 1 output signal upon the Q2 output terminal and a logic 0 output signal upon the $\overline{Q2}$ output terminal. The logic 0 output signal present upon the Q1 output terminal of J–K flip-flop circuit 10 and the logic 0 output signal present upon the $\overline{Q2}$ output terminal of J–K flip-flop circuit 20 are applied with the next clock pulse to respective input terminals A3, B3 and C3 of NAND gate 13, consequently, this device produces a logic 1 output signal upon the $\overline{A3B3C3}$ output terminal thereof. This logic 1 output signal is applied to both the A4 and B4 input terminals of two-input NAND gate 14 which produces a logic 0 output signal upon the A4B4 output terminal thereof. Upon the next negative transition of a clock pulse, J–K flip-flop circuit 10 is unaffected and remains in the logic 0 state. However, with a logic 0 electrical signal and a logic 1 electrical signal present upon respective J2 and K2 input terminals of J–K flip-flop circuit 20, this device is triggered to the logic 0 state with a logic 0 output signal present upon the Q2 output terminal and a logic 1 output signal present upon the $\overline{Q2}$ output terminal thereof. The logic 0 electrical signal present upon the Q1 output terminal of J–K flip-flop circuit 10 is applied to the A3 input terminal of three-input terminal NAND gate 13, consequently this device produces a logic 1 output signal upon the $\overline{A3B3C3}$ output terminal thereof. This logic 1 put signal upon the A4B4 output terminal thereof. The minals of NAND gate 14 which produces a logic 0 output signal upon the $\overline{A4B4}$ output terminal thereof. The single pulse test circuit of this invention stabilizes in this condition so long as movable contact 28 of switch 25 is maintained in electrical contact with stationary contact 27 or is positioned between stationary contacts 26 and 27 and is in a condition to produce another single output electrical pulse upon the next operation of movable contact 28 to stationary contact 26.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A single pulse test circuit for separating a single electrical pulse from a series of electrical pulses upon the operation of an electrical switch comprising in combination with a source of a series of electrical pulses and an electrical switch, first and second type J–K flip-flop circuits each having a J and a K input terminal, a clock pulse input terminal and a Q and a $\overline{Q}$ output terminal, means for connecting said Q and $\overline{Q}$ output terminals of said first J–K flip-flop circuit to said J and K input terminals of said second J–K flip-flop circuit, respectively, circuit means including said electrical switch for applying a logic ONE electrical signal to a selected one of said input terminals and a logic ZERO electrical signal to the other one of said input terminals of said first J–K flip-flop circuit and, upon the operation of said electrical switch, for reversing the electrical signals applied to each of said input terminals, means for connecting said source of a series of electrical pulses to said clock pulse input terminal of both of said J–K flip-flop circuits, and circuit means responsive to the same logic electrical signal upon each said Q output terminal of said first J–K flip-flop circuit and said $\overline{Q}$ output terminal of said second J–K flip-flop circuit and one of said series of electrical pulses for producing a single output electrical pulse.

2. A single pulse test circuit for separating a single electrical pulse from a series of electrical pulses upon the operation of an electrical switch comprising in combination with a source of a series of electrical pulses and an electrical switch, first and second type J–K flip-flop circuits each having a J and a K input terminal, a clock pulse input terminal and a Q and a $\overline{Q}$ output terminal, means for connecting said Q and $\overline{Q}$ output terminals of said first J–k flip-flop circuit to said J and K input terminals of said second J–K flip-flop circuit, respectively, circuit means including said electrical switch for applying an electrical signal of one polarity to said J input terminal and an electrical signal of another polarity to said K input terminal of said first J–K flip-flop circuit and, upon the operation of said electrical switch, for reversing the polarity of the electrical signals applied to each of said J and K input terminals, means for connecting said source of a series of electrical pulses to said clock pulse input terminal of both of said J–K flip-flop circuits, and circuit means responsive to an electrical output signal of the same polarity upon each said Q output terminal of said first J–K flip-flop circuit and said $\overline{Q}$ output terminal of said second J–K flip-flop circuit and one of said series of electrical pulses for producing a single output electrical pulse.

3. A single pulse test circuit for separating a single electrical pulse from a series of electrical pulses upon the operation of an electrical switch comprising in combination with a source of a series of electrical pulses and an electrical switch, first and second type J–K flip-flop circuits each having a J and a K input terminal, a clock pulse input terminal and a Q and a $\overline{Q}$ output terminal, means for connecting said Q and $\overline{Q}$ output terminals of said first J–K flip-flop circuit to said J and K input terminals of said second J–K flip-flop circuit, respectively, circuit means including said electrical switch for applying an electrical signal of one polarity to said J input terminal and an electrical signal of another polarity to said K input terminal of said first J–K flip-flop circuit and, upon the operation of said electrical switch, for reversing the polarity of the electrical signals applied to each of said J and K input terminals, a NAND gate having three input and one output terminals, a NAND gate having two input and one output terminals upon which said separated pulse appears upon the depression of said electrical switch, means for connecting said source of a series of electrical pulses to said clock pulse input terminal of both of said J–K flip-flop circuits and to one of said input terminals of said three input NAND gate, means for connecting said Q output terminal of said first J–K flip-flop to another one of said input terminals of said three input NAND gate, means for connecting said $\overline{Q}$ output terminal of said second J–K flip-flop to the third said input terminal of said three-input NAND gate, and means for connecting said output terminal of said three-input NAND gate to both said input terminals of said two-input NAND gate.

4. A single pulse test circuit for separating a single electrical pulse from a series of electrical pulses upon the operation of an electrical switch comprising in combination with a source of a series of electrical pulses and an electrical switch, first and second type J–K flip-flop circuits each having a J and a K input terminal, a clock pulse input terminal and a Q and a $\overline{Q}$ output terminal, means for connecting said Q and $\overline{Q}$ output terminal, means for connecting said Q and $\overline{Q}$ output terminals of said first J–K flip-flop circuit to said J and K input terminals of said second J–K flip-flop circuit, respectively, circuit means including said electrical switch for applying a logic ONE electrical signal to said J input terminal and a logic ZERO electrical signal to said K input terminal of said first J–K flip-flop circuit and, upon the operation of said electrical switch, for reversing the electrical signals applied to each of said J and K input terminals, a NAND gate having three input and one output terminals, a NAND gate having two input and one output terminals upon which said separated pulse appears upon the depression of said electrical switch, means for connecting said source of a series of electrical pulses to said clock pulse input terminal of both of said J–K flip-flop circuits and to one of said input terminals of said three-input NAND gate, means for connecting said Q output terminal of said first J–K flip-flop to another one of said input terminals of said three-input NAND gate, means for connecting said $\overline{Q}$ output terminal of said second J–K flip-flop to the third said input terminal of said three-input NAND gate, and means for connecting said output terminal of said three-input NAND gate to both said input terminals of said two-input NAND gate.

* * * * *

PO-1050
(5/69)

UNITED STATES PATENT OFFICE
CERTIFICATE OF CORRECTION

Patent No. 3,694,667 Dated September 26, 1972

Inventor(s) William C. Staker, Jr.

It is certified that error appears in the above-identified patent and that said Letters Patent are hereby corrected as shown below:

Column 4, line 50, "$\overline{Q1}$" should read -- Q1 --; "$\overline{Q2}$" should read -- Q2 --; line 52, "Q1" should read -- $\overline{Q1}$ --; line 53, "$Q_2$" should read -- Q2 --; Column 6, line 64, "put" should read -- output --; same line, after "signal" should read -- is applied to both the A4 and B4 input terminals of NAND gate 14 which produces a logic 0 output --; same line, delete "The"; delete line 65, line 66, delete "put"; Column 7, Claim 2, line 9, "J-k" should read -- J-K --.

Signed and sealed this 27th day of March 1973.

(SEAL)
Attest:

EDWARD M.FLETCHER,JR.
Attesting Officer

ROBERT GOTTSCHALK
Commissioner of Patents